The present invention relates to improvements in the reduction of iron ore, and more particularly to a process and apparatus for the reduction of iron oxide ore by means of carbon-containing fuel wherein the ore is used in the form of particles having a critical minimum size.

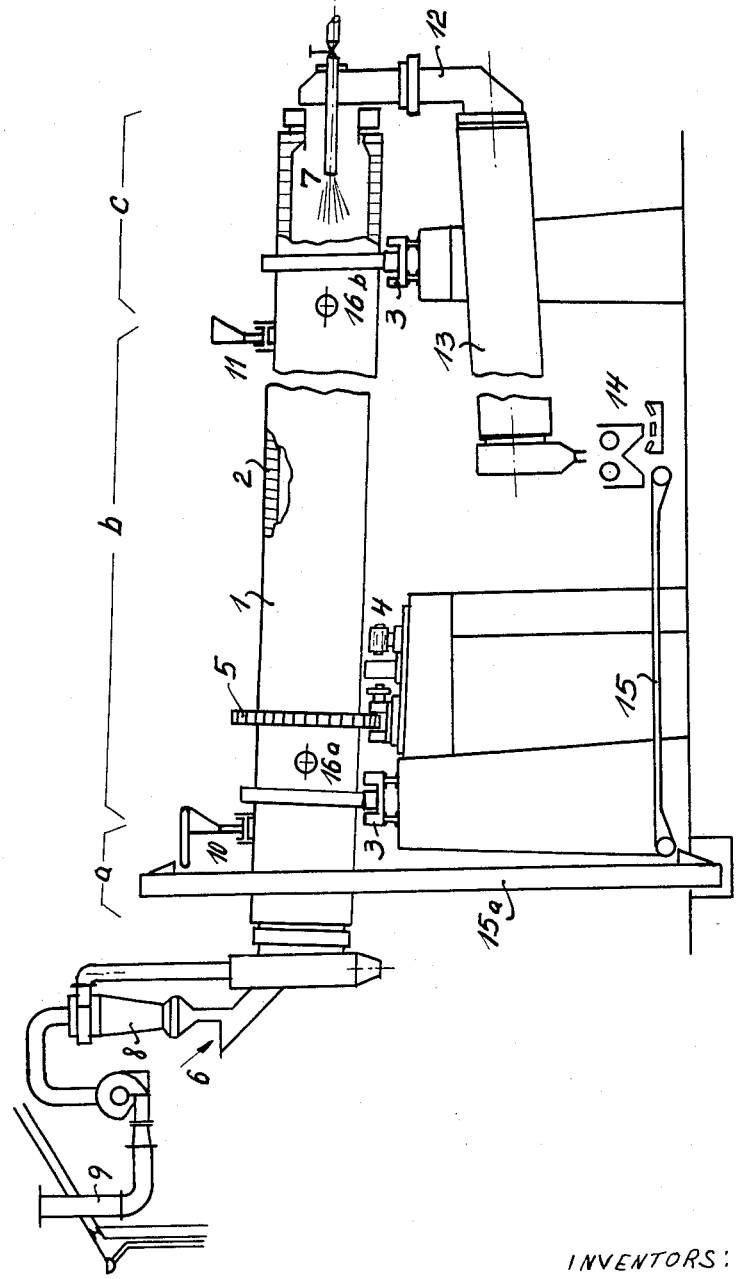
INVENTORS:
KURT MEYER, HANS RAUSCH, WOLFGANG JANKE, WALTER KOCH, GÜNTER HEITMANN
By Burgess, Dinklage & Sprung
ATTORNEYS 3,180,725
PROCESS FOR REDUCTION OF IRON ORE WITH SEPARATE INTRODUCTION OF REDUCING AGENT
Kurt Meyer, Frankfurt am Main, Hans Rausch, Oberursel, Taunus, Günter Heitmann, Frankfurt am Main, Wolfgang Janke, Oberursel, Taunus, and Walter Koch, Offenbach (Main), Germany, assignors to Metallgesellschaft, A.G., Frankfurt am Main, Germany, a German corporation
Filed Sept. 15, 1961, Ser. No. 156,182
Claims priority, application Germany, Sept. 15, 1960, M 46,572; Sept. 17, 1960, M 46,591; Apr. 13, 1961, M 48,683
7 Claims. (Cl. 75—33)

It is known to reduce iron oxide ores in finely granulated or pelletized form in a rotating cylindrical kiln, usually positioned horizontally or at an incline from the inlet to the discharge end thereof, in order to produce magnetite, metallic iron or a mixture of both, for example from hematite. This conventional reduction is customarily performed by admixing solid fuel with the iron ore, and heating the ore-fuel mixture to the reduction temperature by a burner placed at the output or discharge end of the kiln. At the inlet end, the solid mixture of raw material is pre-heated by the hot exhaust gases, coming from the reduction zone. It is also known to assist this pre-heating by burning in the pre-heating zone, by means of additional air introduced at that point, the carbon monoxide which in contained in the hot exhaust gases coming from the reduction zone. In this way not only is the sensible heat of the hot gases used to preheat the ore-fuel mixture, but also the combustion of the carbon monoxide present contributes further heat for this purpose. Suitably, agents, such as limestone may be added to the mixture of solid raw materials in order to fix the sulfur contained in the fuel to prevent the contamination of the reduced iron ore thereby. The heat economy of the over-all process may be improved as well by recycling back into rotating cylindrical kiln the dust-like material carried out with the final exhaust gases exiting from the inlet end of the kiln.

A disadvantage of the conventional process of reducing iron ore is found in the fact that heat economy and efficient complete fuel combustion is not always attained. This is true since during the reduction at the high temperatures necessary therefor, the formation of carbon monoxide rather than carbon dioxide, by the establishment of Boudouard's equilibrium, cannot be avoided. Due to the equilibrium conditions present in the kiln, this carbon monoxide can be burned to carbon dioxide only to a very slight extent in the presence of solid carbon in the reduction zone, and therefore it is lost with the exhaust gases, thus constituting a heat loss and an over-all lowering of the efficiency of the process.

Attempts have been made to avoid this disadvantage by feeding the finely granulated ore in the rotating cylindrical kiln without any carbon being added therewith, such that the carbon fuel required for the reduction has to be added to the rotating kiln at a point at which the temperature required for the reduction has already been attained. This attempt, however, has not found practical application because it entails other disadvantages such as the fact that the solid carbon-containing fuel, such as coal, first comes into contact with the ore at a point at which considerable danger exists of causing the ore to plastify. This is true since the high temperature present in the reduction zone, usually around 1100 degrees C., causes the ore to plastify or assume a doughy consistency which, as is well recognized, gives rise to disturbances in the over-all operation. This plastification may be avoided in accordance with the conventional techniques, only by providing in advance for a sufficiently large excess of solid carbon-containing fuel. In practice, therefore, this proposal has not found wide industrial application, so that in the reduction of iron ore the fine ore is always introduced into the input end of the kiln together with the coal or other solid carbon-containing fuel.

It is an object of the present invention to overcome the foregoing disadvantages and to provide a process for the reduction of iron oxide ore by means of carbon-containing fuel, wherein the iron oxide ore is used in the form of particles of a minimum required size and the carbon-containing fuel is only introduced into the ore after the ore has been preheated.

Other and further objects of the invention will become apparent from a study of the within specification.

It has been found in accordance with the present invention that an improved process may be provided for the reduction of iron oxide ore by means of solid carbon-containing fuel which comprises passing the iron oxide ore in the form of particles having a grain size of at least 6 mm. through a pre-heater zone to preheat the ore, and thence through a reduction zone while introducing the carbon-containing fuel into the preheated ore in the reduction zone. The hot exhaust gases on reduction of the ore are passed in reverse direction through the pre-heater zone to preheat the incoming ore with the sensible heat of such gases, while the reduced ore product may be recovered from the reduction zone conveniently.

The solid carbon-containing fuel may be actually formed in the reduction zone by the introduction thereinto of a fluid carbon-containing fuel which produces solid carbon-containing residues at the reduction temperatures employed. By using a caking or gasifying carbon-containing solid reductant as fuel, gaseous and vaporous products formed therefrom in the reduction zone may be used to preheat the incoming raw iron ore with the sensible heat thereof and also upon combustion with further oxygen-containing gas in the preheater zone to contribute additional heat for preheating the ore.

If desired, a sulfur-fixing agent may be admixed with the ore prior to passage through the reduction zone in order to fix the sulfur contained in the fuel. The sulfur-fixing agent may include materials such as limestone, dolomite, etc., and preferably the agent is admixed with the ore prior to passage of the same through the preheater zone.

Generally, the solid fuel is introduced into the preheated ore in the reduction zone, said zone being maintained at the reduction temperature of the ore. In accordance with the invention, reduction temperatures are contemplated which range between about 700–1100 degrees C.

It is most preferred, in accordance with the present invention, to introduce the ore into the preheater zone in the form of roasted pellets having a grain size of at least 6 mm.

In accordance with one embodiment of the invention, the ore is passed through the reduction zone along a rotating tubular path, such as a cylindrical kiln, the preheating being carried out by passage of the ore through a preheater zone along a tubular path connected directly with the reduction zone rotating tubular path. In fact, it is preferred to pass the ore along a continuous rotating tubular path, such as a cylindrical kiln, wherein the first portion of the path represents the preheater zone, and the second portion represents the reduction zone, the fuel being introduced at a point along the path after the preheater zone.

Thus, in accordance with a preferred embodiment of the invention, the ore is passed along a continuous rotating tubular path having an initial and a terminal end, the initial portion of the path representing the preheater zone and the terminal portion of the path representing the reduction zone. Combustion air is introduced into the preheater zone while the fuel is introduced at a point along the path after the preheater zone. Accordingly, the CO-containing reducing gases formed in and escaping from the gas-rich fuel employed in the reduction zone are burned in the preheater zone by the combustion air introduced into the preheater zone, and the reduced ore product is discharged from the terminal end of the path. Significantly, a gasifying carbon-containing solid reductant is used as a fuel, said fuel being introduced into the reduction zone at a point along the path a pre-determined distance before the terminal end of the path, said distance representing a final zone having a path length just sufficient for the coking of the solid reductant to be substantially completed. The heating of the final zone can be performed, in this instance, exclusively by the combustion of the gaseous and vaporous carbonization products developed in the coking zone. The solid reductant, upon coking, is separated from the discharged reduced ore product and recycled back to the rotatable tubular path at a point closer to the initial end thereof. Preferably, the cross-section of the rotatable tubular path, i.e. the cylindrical kiln, is enlarged along that portion thereof from the point of introduction of the gasifying carbon-containing solid reductant to the terminal end thereof.

Carbon monoxide, of course, is produced in the reduction zone by reaction of the carbon-containing fuel with the $CO_2$ present in the atmosphere, which in turn is formed from the CO by the oxygen content of the ore. Such carbon monoxide is conveniently passed in reverse direction along the path from the reduction zone to the preheater zone and thence substantially completely burned in the preheater zone along a path length between the point at which the fuel is introduced and the point at which the ore is introduced into the rotary tubular path. The combustion heat generated by the burning of the carbon monoxide serves to preheat the incoming ore in addition to the sensible heat of the carbon monoxide containing gas.

All in all, the present invention represents an improvement in the process for the production of iron oxide ore by means of solid carbon-containing fuel which includes preheating the iron oxide ore in the form of pellets having a grain size of at least about 6 mm. in a preheater zone and thence passing the preheated ore along a rotating tubular path through a reduction zone while introducing the solid carbon-containing fuel into the preheated ore in the reduction zone. The hot exhaust gases formed during reduction of the ore are suitably passed from the reduction zone to the preheater zone to treat the incoming ore by the sensible heat of such hot gases. The reduced ore product is, of course, readily recovered from the reduction zone in the conventional manner. As aforesaid, the reduction is usually carried out at a temperature of between about 700–1100 degrees C., whereby oxygen-containing gas introduced directly into the reduction zone and further oxygen-containing gas introduced directly into the preheater zone cause the suitable completion of combustion of the gases to use up the maximum energy present therein for the over-all reduction operation. Specifically, the hot exhaust gases, including reducing gaseous and vaporous carbonization products from the fuel and carbon monoxide, formed in the reduction zone, are passed from the reduction zone to the preheater zone for substantially complete burning therein, with the further oxygen-containing gas directly introduced into the preheater zone. In this manner, the incoming ore will be suitably preheated at high efficiency with respect to the over-all fuel consumption, throughput, sensible heat, etc. For carrying out the process in accordance with the invention, an apparatus is used which comprises a rotatable tubular kiln having an inlet means for crude ore at one end portion thereof and a discharge means for reduced ore at the other end portion thereof. Significantly, an improved apparatus is present since a plurality of independently operable feeding means, for introduction of carbon-containing fuel into the tubular kiln, are provided, which are disposed at predetermined points spaced along the extent of the kiln. It is required that such plurality of independently operable feeding means begin at a point along the extent of the kiln beginning after the inlet means at the one end portion, in order to ensure that the fuel will not prematurely contact the ore, i.e. before such ore has been sufficiently preheated.

It will be appreciated, therefore, that in accordance with the invention plastification of the ore in the area immediately preceding the reduction zone can be prevented effectively, even without the addition of carbon-containing fuel, where, instead of fine ore, coarse pieces of at least 6 mm. are used, preferably in the form of pellets. By this procedure, it is rendered possible to add carbon-containing fuel afterwards, i.e. at a point following the preheating zone, and accordingly, the prior art disadvantages will be completely avoided. The use of pellets, which have been made by a rolling process in a granulating drum, for instance, or on a granulating plate, and then baked hard, has the additional advantage over the use of coarse natural ore that such pellets possess a uniform micro-porous structure. Such pellets can, therefore, be better penetrated by the reducing gas for the desired reduction treatment. Moreover, on account of the speroidal shape of such pellets, the danger of their caking together, even in the event of considerable overheating in the reduction zone is still further decreased since the number and size of the contact surfaces of pellets in this form are much smaller as compared with those of irregularly shaped natural ore particles.

While it is true it is known to reduce agglomerates of iron ores in a rotating cylindrical kiln either exclusively by means of such reducing gases as hydrogen or carbon monoxide, or by the simultaneous action of a solid carbon-containing reductant and of the carbon monoxide formed thereby the prior art has not heretofore appreciated the introduction of the solid carbon-containing reductant into the kiln at a point where the preheating of the ore to reduction temperature is substantially completed.

Thus, a specific procedure contemplated by the invention includes first rendering the ore to the form of pieces or pellets having a minimum size of 6 mm., and feeding such pieces or pellets into a rotating cylindrical kiln without the addition of a solid carbon-containing fuel, so that the ore may be heated in the kiln, before it enters the actual reduction zone, to a temperature generally amounting to approximately 700–1100 degrees C. Accordingly, the solid carbon-containing reductant may be added in the reaction zone itself not only to ensure the prevention in the preheating zone of offsetting Boudouard's equilibrium between the solid carbon and the carbon dioxide (which partially originates in the reduction zone and partially forms in the preheater zone by the combustion of the carbon monoxide content of the exhaust gases from the reduction zone) since no solid carbon is present in the preheater zone to upset this equilibrium but also the plastification and caking of the charge is prevented.

If desired the entire amount of limestone, dolomite, or the like, which is needed in the reduction zone for fixing the sulfur content in the fuel, may be added to the charge of solid ore before the latter is fed into the reduction zone. This permits the lime, dolomite, or the like to be calcined right in the preheater zone. In this way, the carbon dioxide which is released by disassociation of the calcium carbonate, magnesium carbonate, and the like is likewise kept out of the reduction zone, so that this carbon dioxide as well will be unable to cause any undesired carbon monoxide formation by reacting with carbon in the reduction zone.

With respect to the preheater zone, the preheating of the charge of solids, including the ore, together with the sulfur-fixing agent, if desired, may be performed, preferably as in the conventional processes, by means of the hot exhaust gases from the reduction zone as well as by burning the carbon monoxide content thereof, if desired, by means of additionally introduced combustion air. This preheating can be performed in any known apparatus appropriate for the purpose, as for example, in a shaft serving as feed container for the rotating kiln. Of course, an alternate embodiment of the invention contemplates the performing of the preheating in the same apparatus as the reduction, i.e. in the rotating cylindrical kiln itself. To this end, it is necessary for the feeding of the solid fuel, merely to provide on the rotating kiln, at a sufficient distance downstream from the ore feeding apparatus to allow for suitable preheating, an apparatus for feeding the carbon-containing reductant through mantle openings. Alternatively, the feeding of the carbon-containing reductant may be carried out by means of a feed pipe of appropriate length extending from the input or output end into the interior of the kiln and having one or more openings therein for introducing the carbon-containing fuel into the kiln. While a separate feeding apparatus situated downstream from the point at which the ore is fed has been used heretofore, for the return of fine dust carried out of the inlet end of the kiln with the exhaust gases, the improvement of the invention contemplates the separate introduction of solid fuel initially into the kiln at a point after the end of the preheater zone.

As aforesaid, the solid fuel can be fed into the reduction zone itself by means of liquid or gaseous carbon-rich fuels on to the glowing stratum in the reduction zone. As a result, the liquid or gaseous fuels will be decomposed very rapidly and completely into solid carbon and gaseous or vaporous cracking products at the high temperature prevailing in the reduction zone. These cracking products are then able to be burned completely in the preheater zone by means of the additionally introduced coubustion air thereat. The liquid carbon-containing fuel in this case may be injected in a manner, from above, from below, or laterally, or the same may be introduced in any other way considered appropriate.

In this connection, it has furthermore been found that the invention provides the additional advantage that it does not necessitate the use of costly gas-poor and non-caking solid reductants such as coke, anthracite, and the like, which are required by the conventional processes. Instead, in accordance with the invention, cheap gas-rich and even bituminous coals may be used as fuel. The employment of coarsely granulated ore in association with the separate addition of solid-containing fuel downstream of the preheater zone offers tthe advantage that the gases driven off from the fuels are not lost by being discharged unburned from the kiln as is the case in the prior art techniques. Rather, these gaseous components of the solid fuel can still be burned within the rotating cylindrical kiln by the introduction of oxygen containing gas, much as air, through mantle nozzles, for example, thereby being utilized for the preheating of the crude, cold iron ore. However, it is also possible to retard the infeed of oxygen to some extent, whereby it is even possible for these gases to prereduce the pieces and particles of crude ore prior to actual entrance into the reduction zone.

As will be appreciated, the plurality of fuel introducing devices provided on the kiln are positioned along the extent thereof at points which best correspond to the action achieved in consequence of the particular properties of the fuel being used. Advantageously, due to the improvements of the invention, any solid carbon-containing fuel may be used, including even very gas-rich coals as well as lignite, peat, brown coal, and the like.

A further advantage of the invention is that the central burners heretofore considered necessary at the output end of the kiln for the required performance of the endothermic process may now be omitted. In this embodiment, gassing or gasifying reductants are fed into the rotary kiln just upstream of the output end thereof. The distance of the point of entry of these reductants from the output end is such that the section of the kiln downstream of that point is barely long enough to effect the practically complete coking of the gassing or gasifying reductant. Specifically, where rotary kilns having technical dimensions of 30 meters or more in length are concerned, this final roasting zone represents approximately 4 to 6 meters of the rotary path ahead of the output end, depending upon the amount of volatile components contained in the gasifying reductant. In order to compensate for the increase in volume, occasioned by the generation of gaseous or vaporous carbonization products, it is expedient to increase accordingly the cross section of the final portion of the kiln downstream of the point at which the gasifying reductant is added. The gaseous components driven off in the final zone may be burned by means of air entering a feed pipe in the final zone, so that the entire amount of heat required may be supplied in this way. In contrast thereto, in accordance with former processes, the heat required at least partially had to be provided by means of a central burner fed with fuel in gaseous, liquid, or dust form in the reduction zone of the kiln.

As a result of the improvement of the invention, it is possible to achieve reduction factors as good as those heretofore achieved in the art, i.e. up to 95% efficiency, whereas the coal consumption or other solid carbon-containing fuel is at least about 5% lower than that required in the conventionally applied industrial processes.

EXAMPLES

Pellets produced on the granulating plate from a magnetic ore ground into a product containing 80% of grains below $80\mu$ were used for all tests. The green pellets were baked hard on a sinter band by means of hot gases with a temperature of 1,200 to 1,300° C. The hard-baked pellets had an Fe-content of 60.1% and were 12–15 mm. in diameter.

*Example 1.—Gas-poor-fuel without double feeding*

For carrying out this test the apparatus as shown in the diagram was used. The rotating cylindrical kiln 1 of 9 m. in length with an interior diameter of 0.5 m. is provided with the brick-lining 2, runs on rollers 3 and is operated by means of the motor 4 through the gear rim 5.

60 kg./h. of the hard-baked ore pellets, together with 3.6 kg./h. dolomite of a grain size of 1–3 mm. were charged into the kiln by means of the feeding device 6. At the discharge end of the kiln is arranged a central burner pass through the whole length of the kiln and are discharged at a temperature of 600° C. through the dust collector 8 and the flue 9. In the preheating zone *a* of 2 m. in length the pellets were heated to reduction temperature, i.e. up to 700° C. in the present example, by means of the hot gases coming from the main reduction zones *b* and *c* with a temperature of about 800° C. For this preheating, not only the sensible heat of the gases coming from the main reduction zone but also their latent heat content was utilized in such a manner that their combustible components (mainly CO and $H_2$ in this test) were burnt by means of air entered into the preheating zone. This air was introduced through nozzles which are not shown in the figure.

At the end of the preheating zone a feeding device 10 for gas-poor lean fuels is arranged. 36 kg./h. fuel were charged through the feeding device 10, the fuel consisting of 27 kg./h. anthracite with a C content of 85% and an S content of 1.5% as well as 9 kg./h. recycled excess carbon. In the remaining portion of the kiln, i.e. sections $b$ and $c$ having a total length of 7 m., reduction was done by means of the solid fuel and the CO formed from this latter. In the main reduction zone the charge was heated, additionally to the heat effect of the central burner 7, by means of mantle burners 16 distributed over the length of the kiln. Of the said mantle burners only the two burners 16a and 16b are shown in the figure for the sake of an easier survey. The mantle burners were as well fed with city gas. However, also liquid or powdery solid fuels can be used both for this purpose and for the central burner 7. By means of this additional heating the temperature in the main reduction zone was kept constant at 1100° C.

The product consisting of 42 kg./h. of reduced pellets, 9 kg./h. excess carbon and 4.5 kg./h. of a mixture of carbon ash and the compounds formed from the dolomite and the sulphur content of the anthracite (CaO, MgO, CaS, MgS) was discharged with a temperature of 1000° C. through a gas-tight sluice 12 and cooled down to room temperature, under exclusion of air, in the cooler 13. The cooled mixture was separated in the screening and electromagnetic separating device 14. The obtained pellets with an Fe content of 96% and a metallic iron content of 90% were delivered as finished product. The 9 kg./h. excess carbon were recycled via the conveying devices 15 and 15a into the feeding sluice 10.

The amount of gas consumed in the burner 7 and the mantle burners 16 was 30 Nm.$^3$/h. in this test, the city gas used had a heat value of 3860 kg.-cal./Nm.$^3$.

The flue gas escaping through flue 9 had a content of combustible components of below 0.5%.

In a comparative test, for which all other conditions remained the same, except that the carbon was charged according to prior art together with the pellets through the feeding device 6, the flue gas escaping from flue 9 contained 5.3% (CO+H$_2$).

*Example 2.—Corresponding to Example 1, except that gas-rich carbon was used*

The same type of pellets as described in Example 1 was used. The apparatus applied was also nearly equal to that used in Example 1. However, the interior diameter of the test kiln was enlarged to 0.8 m. behind the rear feeding device 11 (not used in test 1).

Again 60 kg./h. hard-baked pellets and 3.6 kg./h. dolomite were charged through the feeding device 6. Initially, a larger amount of gas-rich carbon than was later on necessary for maintaining the stationary condition was introduced through the feeding device 11, in order first to produce the amount of calcined excess carbon required for the feeding device 10. During the stationary working condition were then added 39 kg./h. of a gas-rich coal with a C content of 68% and 20% volatile constituents to the charge, the sulphur content of that coal being 1.7%. Through the feeding device 12, 84 kg./h. of a mixture consisting of 42 kg./h. reduced pellets, 37 kg./h. calcined excess carbon and 5 kg./h. of a mixture consisting of ash and dolomite reaction residues were discharged. After cooling in the cooler 13 and separation in the installation 14, the pellets were delivered as finished product with a total Fe content of 96% and a metallic iron content of 90%. The separated roasted 30 kg./h. carbon was recycled through the conveying devices 15 and 15a into the feeding device 10. The central burner 7 operated similarly to test 1. The additional heating of the main reduction zone $b$, however, was not effected by means of city gas fed in through the mantle burners 16, but exclusively by combustion of the gaseous and vaporous carbonization products coming from the calcination zone $c$, by means of air introduced as well through the mantle burners 16. Also the heating of the preheating zone $a$ was done, similarly to Example 1, both by the sensible heat of the gases coming from the main reduction zone $b$ and by combustion of the combustible constituents contained in those gases and by means of the air introduced through the mantle burners.

The temperature at the end of the heating zone was adjusted to 750° C., the temperature in the main reduction and the carbonization zones being 1080° C. The consumption of city gas with a heating value of 3860 kg.-cal./Nm.$^3$ amounted to 13 Nm.$^3$/h. in this test, the content of combustible constituents in the gases escaping from flue 9 being 2.5%.

*Example 3.—Heating without central burner*

Conditions were essentially the same as in Example 2 with the modification, however, that the feeding device 11 for the gas-rich carbon was shifted by 1 m. towards the discharge end, so that the carbonization zone was only 1 m. long and that the amount of gas-rich coal charged through the feeding device 11 was increased from 39 kg./h. to 45 kg./h. in stationary condition. In this case the central burner 7 could be exclusively fed with combustion air instead of heating gas, so that it was possible to introduce a sufficient amount of heat also into the carbonization zone solely through the combustion of the combustible gases and vapours developed in the carbonization zone. The results, especially the amount and composition of the discharged product were practically the same as in Example 2, whilst the consumption of city gas could be reduced to nil. The content of combustible constituents of the flue gas escaping through flue 9 was within the analytical tolerances equal to Example 2.

*Example 4.—Several staggered feeding devices for gas-rich coal*

The same type of pellets and essentially the same apparatus as in Example 1 were used. The charged amounts of the various materials used was in stationary condition 60 kg./h. pellets, 3.6 kg./h. dolomite, 45 kg./h. gas-rich carbon. Also the temperature and its distribution in the kiln were the same as in Example 1. However the total amount of 45 kg./h. gas-rich coal was fed through three different feeding devices which were arranged behind the feeding device 6 and spaced 4 m., 6 m. and 8 m. apart. The whole amount of calcined excess carbon, i.e. 37 kg./h. was recycled into feeding device 10. This method necessitated the cross section extension at the discharge end of the kiln as applied in the tests 2 and 3. The amount and composition of the discharged product were the same as in the Examples 2 and 3, however, the content of combustible constituents of the flue gases expelled through flue 9 was below 1%.

*Example 5.—Use of liquid fuel*

These tests were made under essentially the same conditions as in Example 4 with three feeding devices for gas-rich fuel arranged behind feeding device 10 and spaced 4 m., 6 m. and 8 m. apart. However, 11 kg./h. heavy fuel oil instead of 15 kg./h. gas-rich coal were introduced into the feeding device arranged at a distance of 4 m. behind the feeding device 9 and which was designed as a special device for the selective charge of solid fuel, the results being practically the same as in Example 4.

What is claimed is:

1. Process for the thermal reduction of iron ore by means of solid carbon-containing fuel which comprises passing iron ore in the form of particles having a grain size of at least 6 mm. and essentially free from externally admixed carbon through a preheater oxidation zone to preheat the ore while oxidizing completely gaseous substituents present therein, and thence through a reduction zone, introducing an excess of substantially volatiles-free solid carbon-containing fuel into the already preheated ore in the reduction zone to reduce substantially such ore while generating hot gaseous substituents, passing the hot substantially reduced ore into a volatilization zone, introducing volatiles-rich solid carbon-containing fuel into contact with the hot substantially reduced ore in said volatilization zone to volatilize substantially completely the volatile constituents in said volatiles-rich fuel, recovering the reduced ore reaction mixture including the remaining solid fuel from the volatilization zone, passing the volatilized volatile constituents from said volatilization zone to said reduction zone to aid in the reduction of the preheated ore, and passing the hot gaseous substituents generated in said reduction zone to said oxidation zone for substantially complete oxidation therein to preheat the incoming ore with both the sensible heat and the latent heat of such hot gaseous substituents.

2. Process according to claim 1 wherein an excess of volatiles-rich solid fuel is introduced into said volatilization zone, and the remaining solid fuel recovered from said volatilization zone is recycled to the reduction zone as the volatiles-free solid carbon-containing fuel.

3. Process according to claim 1 wherein a sulfur-fixing agent is admixed with the iron ore prior to passage through the reduction zone to fix the sulfur contained in said fuel, the reduction temperature is between about 700–1100° C, the iron ore is introduced into the oxidation zone in the form of roasted pellets having a grain size of at least 6 mm, and sufficient air is introduced into said oxidation zone to provide substantially complete oxidation of the hot gaseous substituents present therein.

4. Process according to claim 3 wherein the flow cross-section of said volatilization zone is larger than that of said reduction zone.

5. Process according to claim 3 wherein fresh substantially volatiles-free solid carbon-containing fuel is introduced with the recycled fuel into the ore after the preheating.

6. Process for the reduction of iron oxide ore which comprises introducing iron oxide ore essentially free from carbonaceous material onto a single, inclined tubular rotary path defined by a rotary kiln, passing said ore along said path through a preheater oxidation zone containing hot exhaust gases for preheating the ore to a temperature of at least about 600° C., introducing an excess of substantially volatiles-free solid carbonaceous fuel selected from the group consisting of precarbonized bituminous, lignite, and peat coals into said ore at a point along said path sufficiently spaced downstream from the point of introduction of said ore to permit substantially complete combustion of the combustible constituents in the exhaust gases present prior to the point of introduction of said volatiles-free precarbonized fuel, said preheater oxidation zone being defined by the portion of said path between the points of introduction of said ore and said precarbonized fuel, passing said ore and said precarbonized fuel along said path through a reduction zone maintained at a temperature sufficient to reduce the ore in the presence of said fuel but below the softening temperature of the ore, introducing an excess of substantially carbonaceous volatiles-rich solid carbonaceous fuel selected from the group consisting of raw bituminous, lignite, and peat coals into said ore at a plurality of spaced apart points along said path, the first of which is spaced sufficiently downstream from the point of introduction of said volatiles-free fuel to allow at least a part of the total reduction to be achieved therebetween, said reduction zone being defined by the portion of said path between the point of introduction of said volatiles-free fuel and the first of said points of introduction of said volatiles-rich fuel, passing the so-treated ore and said volatiles-rich fuel along said path through a carbonization and volatilization zone while maintaining the temperature thereof sufficient to allow gradually therealong the substantially complete release of the volatile constituents of said volatiles-rich fuel, burning a portion of the volatile constituents released from said fuel in said carbonization and volatilization zone to heat said zone, recovering the reduced ore product from the path at a point spaced sufficiently downstream from the last of said plurality of spaced apart points of introduction of said volatiles-rich fuel at least to allow the substantially complete release of the volatile constituents of said volatiles-rich fuel prior thereto, said carbonization and volatilization zone being defined by the portion of said path between the first point of introduction of said volatiles-rich fuel and the point of recovery of said reduced ore product, recovering from said carbonization and volatilization zone in carbonized form, together with the reduced ore product, said volatiles-rich fuel after such release of said volatile constituents therefrom, separating the carbonized form fuel from the reduced ore product and recycling said carbonized fuel recovered from said carbonization and volatilization zone to said path as such substantially volatiles-free solid carbanaceous fuel introduced into the ore after the pre-heating, passing the unburned portion of the volatile constituents released in said carbonization and volatilization zone to said reduction zone to aid in the reduction of the ore in the reduction zone, introducing sufficient oxygen-containing gas into said preheater oxidation zone to burn substantially completely the gases passing therethrough from said reduction zone, and introducing oxygen-containing gas into said reduction zone to burn a portion of the combustible gases present therein for maintaining said temperature therewithin.

7. Process according to claim 6 wherein a sulfur-fixing agent selected from the group consisting of limestone and dolomite is admixed into said ore prior to passage through the preheating zone for fixing the sulfur content in the fuels used, the cross-section of the path being enlarged from the first point of introduction of said volatiles-rich fuel to the point of recovery of said reduced ore product.

References Cited by the Examiner

UNITED STATES PATENTS

| | | | |
|---|---|---|---|
| 890,234 | 6/08 | Jones | 75—34 |
| 981,280 | 1/11 | Jones | 75—36 |
| 1,786,999 | 12/30 | Hornsey | 75—36 |
| 1,864,593 | 6/32 | Gustafsson | 75—34 |
| 1,924,034 | 8/33 | Folliet et al. | 75—36 |
| 2,047,562 | 7/36 | Johannsen | 75—36 X |
| 2,829,042 | 4/58 | Moklebust | 75—36 |
| 2,877,108 | 3/59 | Smith | 75—36 |
| 3,029,141 | 4/62 | Sibakin | 75—34 |
| 3,046,106 | 7/62 | Hemminger | 75—36 |

DAVID L. RECK, *Primary Examiner.*

RAY K. WINDHAM, *Examiner.*

UNITED STATES PATENT OFFICE
CERTIFICATE OF CORRECTION

Patent No. 3,180,725

April 27, 1965

Kurt Meyer et al.

It is hereby certified that error appears in the above numbered patent requiring correction and that the said Letters Patent should read as corrected below.

Column 9, line 22, for the claim reference numeral "1" read -- 2 --; column 10, line 30, for "carbanaceous" read -- carbonaceous --.

Signed and sealed this 28th day of September 1965.

(SEAL)
Attest:

ERNEST W. SWIDER
Attesting Officer

EDWARD J. BRENNER
Commissioner of Patents